Figure 1:
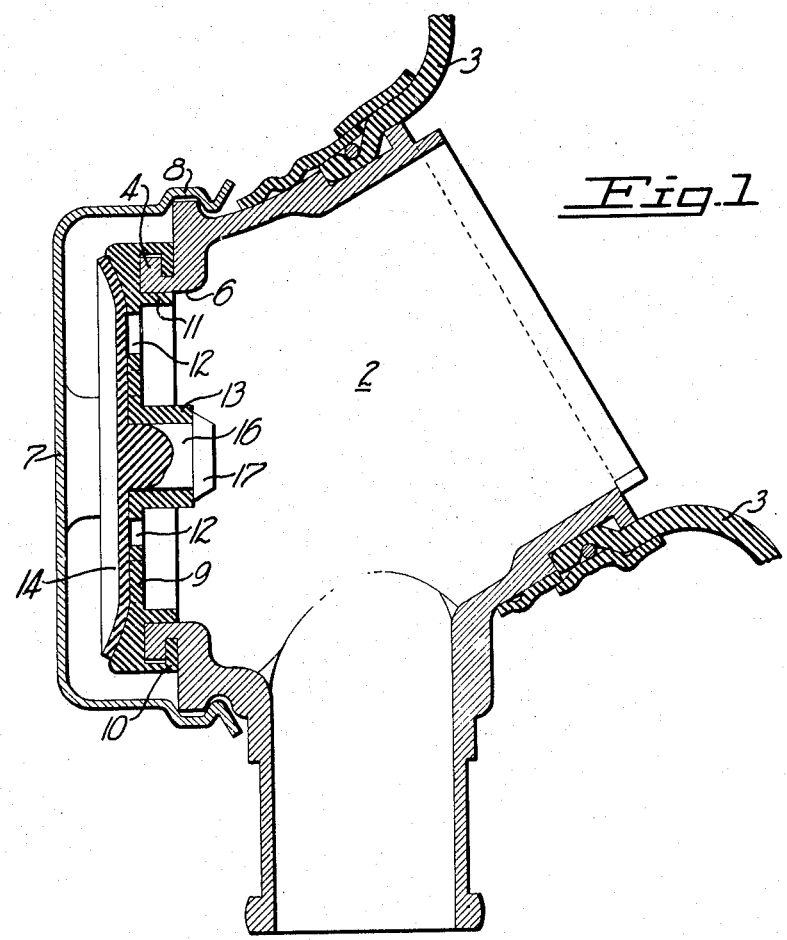

April 21, 1936.   E. W. BULLARD   2,038,267

EXHALATION VALVE

Filed April 2, 1934

INVENTOR.
EDWARD W. BULLARD.
BY Charles J. Evans
HIS   ATTORNEY

Patented Apr. 21, 1936

2,038,267

UNITED STATES PATENT OFFICE 2,038,267

EXHALATION VALVE

Edward W. Bullard, San Francisco, Calif., assignor, by mesne assignments, to E. D. Bullard Company, San Francisco, Calif., a corporation of California Application April 2, 1934, Serial No. 718,652

7 Claims. (Cl. 128—141)

My invention relates to valves, and more particularly to exhalation valves.

It is among the objects of my invention to provide an exhalation valve for gas masks which forms a dependable seal against the entrance of poisonous gases.

Another object of my invention is to provide a valve of the character described which is quickly and easily mounted on the mask.

A further object of my invention is to provide a valve which is of compact construction, and which is not easily damaged.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Figure 2:
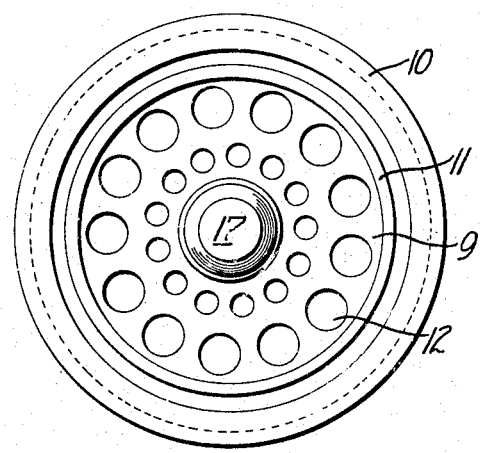

Referring to the drawing:

Figure 1 is a vertical sectional view of the valve structure embodying my invention, the valve being shown in its mounted position over the end of an exhalation duct; and Figure 2 is a bottom view of my improved valve.

In terms of broad inclusion, the exhalation valve of my invention comprises an apertured base disk having a concave outer surface. A circular resiliently flexible diaphragm is provided to overlie the curved surface, and means are provided for connecting the center of the diaphragm to the central portions of the base disk, so that the diaphragm is flexed inwardly and into conformity with the concave surface. Both the diaphragm and base disk are preferably made of rubber, and the latter is preferably provided with a grooved peripheral flange adapted to seat over a flange provided on the exhalation duct of the mask.

In greater detail, and referring particularly to Figure 1 of the drawing, the exhalation valve embodying my invention is shown in conjunction with an exhalation duct 2 mounted on a face piece 3. An out-turned flange 4 is formed about the exhalation opening 6, and the opening is protected by a cover plate 7 held spaced above the opening by clip arms 8. The details of this particular type of mask construction are described in my copending application, Serial No. 584,353, filed January 2, 1932.

My improved valve structure comprises a base disk 9 preferably of rubber, and held in place over the opening 6, by a grooved annular flange 10 seated over the flange 4 of the duct 2. The base disk is further held and sealed by an annular flange 11 projecting into the opening 6 and lying against the inside of the duct. By this arrangement, which is clearly shown in Figure 1, the base disk may be quickly and easily mounted on the exhalation duct, and when in place is firmly fastened and provides a tight seal with the duct.

The outer surface of the base disk is concave, the curvature being preferably limited to the marginal portions of the disk, as shown in Figure 1. The disk is also provided with a plurality of apertures 12 providing air passages through the disk. These apertures may be conveniently arranged in concentric circles, as shown in Figure 2. An inwardly projecting apertured stud 13 is preferably formed at the center of the disk to reinforce the structure.

The passage of air through the apertures 12 is controlled by a circular diaphragm 14 of a resiliently flexible material, such as rubber. This diaphragm is positioned to overlie the outer surface of the base disk, and is connected at its center to the central portions of the disk so that it is flexed inwardly out of its normally flat plane and into conformity with the curvature of the disk surface. The means for holding the diaphragm on the base disk preferably comprises an inwardly projecting plug portion 16 insertible through the apertured stud 13 and having an enlarged head 17 also insertible through the stud aperture and adapted to overlie the inner end of the stud. To facilitate insertion of the head 17 the latter is preferably provided with bevelled edges.

When the diaphragm is mounted on the base disk it lies flatly against and conforms with the concave outer surface of the disk. In this flexed condition the resiliently flexible diaphragm tends to straighten out, which action effects the formation of a tight seal between the diaphragm and the base disk at all times. When the wearer exhales, thereby raising the pressure in the mask above atmospheric pressure, the diaphragm is pushed outwardly to open the ports 12. During the period of inhaling the diaphragm is pulled tightly against the base disk to supplement the sealing action of the flexed diaphragm. It is to be noted however that the diaphragm is constantly tending to seal itself irrespective of the pressure conditions.

Another important feature of my valve structure is that conversation can be had by the wearer, either from person to person or by telephone. Heretofore it has been impossible for the wearer of a mask to make himself heard without lifting or removing his mask. The tremendous advantage of my improvements in this respect will be recognized, both for industrial and for war masks. There are two reasons why conversation can be had through the valve of my invention. First, the diaphragm 14, by reason of the manner in which it is mounted and resiliently held against the base disk 9, operates as a speaking diaphragm and, by vibrating in time with the speaking voice, transmits the sound waves to the regions outside the mask; and second, the valve is positioned immediately ahead of the speaker's mouth so that it is directly affected by the voice.

I claim:

1. A valve comprising a base disk, said disk having a centrally disposed diaphragm holding aperture and peripherally disposed valve apertures, and a rubber diaphragm overlying the disk and having a plug integrally formed at its central portions adapted to extend through the central aperture in the base disk, said plug having an enlarged head formed on its outer end adapted to lie on the back side of the disk for holding the diaphragm in place.

2. A valve comprising a rubber base disk, said disk having a centrally disposed diaphragm holding aperture and peripherally disposed valve apertures, and a rubber diaphragm overlying the disk and having a plug integrally formed at its central portions adapted to extend through the central aperture in the base disk, said plug having an enlarged head formed on its outer end adapted to lie on the back side of the disk for holding the diaphragm in place.

3. A valve structure comprising a duct having a peripheral flange, an apertured rubber base disk mounted over the end of the duct and having a groove adapted to seat over said flange, and a rubber diaphragm overlying the disk and having a plug integrally formed at its central portions adapted to extend through an aperture in the base disk, said plug having an enlarged head formed on its outer end adapted to lie on the back side of the disk for holding the diaphragm in place.

4. A valve structure comprising a base disk having a concave surface and also having an integrally formed boss centrally disposed opposite said surface, said disk having a central diaphragm holding aperture extending through the boss and having valve apertures disposed circumferentially of the boss, and a resiliently flexible diaphragm overlying said disk surface and having a plug integrally formed at its central portions adapted to extend through the central aperture of the disk, said plug having an enlarged head adapted to engage over the end of said boss for holding the diaphragm in place.

5. In combination with a gas mask having a breathing opening, a valve structure comprising an apertured base disk mounted over said opening and having a concave outer surface, a resiliently flexible diaphragm overlying said surface, and means connecting the central portions of the diaphragm to the disk so that the diaphragm is flexed inwardly and into conformity with said concave surface, whereby the diaphragm is held in a stressed condition and with peripheral portions free to vibrate as a speaking diaphragm.

6. In combination with a gas mask having a breathing opening, a valve structure comprising an apertured base disk mounted over said opening and having a concave outer surface, a rubber diaphragm overlying said surface, and means integrally formed on the diaphragm for connecting the central portions of the diaphragm to the disk so that the diaphragm is flexed inwardly and into conformity with said concave surface, whereby the diaphragm is held in a stressed condition and with peripheral portions free to vibrate as a speaking diaphragm.

7. In combination with a gas mask having a breathing opening, a valve structure comprising a base mounted over said opening and having a centrally disposed diaphragm holding aperture and a valve aperture spaced from the central aperture, and a rubber diaphragm overlying the base and having a plug integrally formed at its central portions and extending through the central aperture of the base, said plug having an enlarged head formed on its outer end and lying on the back side of base for holding the diaphragm in place.

EDWARD W. BULLARD.